United States Patent
Yellin et al.

(10) Patent No.: US 11,283,895 B2
(45) Date of Patent: Mar. 22, 2022

(54) SILENT UPDATING OF CONTENT IN USER DEVICES

(71) Applicant: TENSERA NETWORKS LTD., Hod Hasharon (IL)

(72) Inventors: Daniel Yellin, Raanana (IL); David Ben Eli, Modiin (IL); Eilon Regev, Givatayim (IL); Shimon Moshavi, Beit Shemesh (IL)

(73) Assignee: TENSERA NETWORKS LTD., Hod Hasharon (IL)

(*) Notice: Subject to any disclaimer, the term of this patent is extended or adjusted under 35 U.S.C. 154(b) by 208 days.

(21) Appl. No.: 16/619,479

(22) PCT Filed: Jun. 18, 2018

(86) PCT No.: PCT/IB2018/054460
§ 371 (c)(1),
(2) Date: Dec. 5, 2019

(87) PCT Pub. No.: WO2018/234967
PCT Pub. Date: Dec. 27, 2018

(65) Prior Publication Data
US 2020/0162576 A1 May 21, 2020

Related U.S. Application Data (60) Provisional application No. 62/521,563, filed on Jun. 19, 2017, provisional application No. 62/572,494, filed on Oct. 15, 2017.

(51) Int. Cl.
*H04L 29/08* (2006.01)
*H04L 67/5681* (2022.01)
(Continued)

(52) U.S. Cl.
CPC ...... *H04L 67/2847* (2013.01); *H04L 67/2852* (2013.01); *H04N 21/6125* (2013.01); *H04N 21/84* (2013.01); *H04W 4/08* (2013.01)

(58) Field of Classification Search
CPC H04N 21/6125; H04N 21/84; H04L 67/2847; H04L 67/2852; H04W 4/08
(Continued)

(56) References Cited

U.S. PATENT DOCUMENTS 6,182,133 B1   1/2001   Horvitz
6,385,641 B1   5/2002   Jiang et al.
(Continued)

FOREIGN PATENT DOCUMENTS

GB    2350213 A    11/2000

OTHER PUBLICATIONS

Yan et al., "Fast App Launching for Mobile Devices Using Predictive User Context", MobiSys 12, pp. 1-14, Jun. 25-29, 2012.
(Continued)

*Primary Examiner* — Moustafa M Meky
*Assistant Examiner* — Kidest Mendaye
(74) *Attorney, Agent, or Firm* — Kligler & Associates Patent Attorneys Ltd (57) ABSTRACT

An apparatus for content delivery (20) includes a network interface (64) and one or more processors (44, 68). The network interface is configured for communicating over a communication network (32). The one or more processors are configured to receive from a user of a user device (24) a request to access a User-Interface (UI) unit that includes one or more content items, to initially display, in response to the request, the UI unit to the user with versions of the content items that are available for immediate display in the user device, regardless of whether the initially displayed versions are up-to-date or not, and, for at least a content item
(Continued)

whose initially displayed version is not up-to-date, to obtain an up-to-date version of the content item, and merge the up-to-date version of the content item transparently to the user into the UI unit being displayed, to replace the initially displayed version.

36 Claims, 2 Drawing Sheets

(51) Int. Cl.
<table>
<tr><td>H04L 67/5682</td><td>(2022.01)</td></tr>
<tr><td>H04N 21/61</td><td>(2011.01)</td></tr>
<tr><td>H04N 21/84</td><td>(2011.01)</td></tr>
<tr><td>H04W 4/08</td><td>(2009.01)</td></tr>
</table>

(58) Field of Classification Search
USPC .......................................................... 709/224
See application file for complete search history.

(56) References Cited

U.S. PATENT DOCUMENTS

<table>
<tr><td>6,553,409 B1</td><td>4/2003</td><td>Zhang et al.</td></tr>
<tr><td>6,606,525 B1</td><td>8/2003</td><td>Muthuswamy et al.</td></tr>
<tr><td>6,766,352 B1</td><td>7/2004</td><td>McBrearty et al.</td></tr>
<tr><td>6,954,786 B1</td><td>10/2005</td><td>Vered et al.</td></tr>
<tr><td>7,437,364 B1</td><td>10/2008</td><td>Fredricksen et al.</td></tr>
<tr><td>7,461,206 B2</td><td>12/2008</td><td>Bhanoo et al.</td></tr>
<tr><td>8,200,626 B1</td><td>6/2012</td><td>Katzer et al.</td></tr>
<tr><td>8,438,474 B1</td><td>5/2013</td><td>Lloyd</td></tr>
<tr><td>8,447,837 B2</td><td>5/2013</td><td>Devanneaux et al.</td></tr>
<tr><td>8,566,867 B1</td><td>10/2013</td><td>Yang et al.</td></tr>
<tr><td>8,601,052 B2</td><td>12/2013</td><td>Mir et al.</td></tr>
<tr><td>8,635,339 B2</td><td>1/2014</td><td>Luna</td></tr>
<tr><td>8,849,731 B2</td><td>9/2014</td><td>Lymberopoulos et al.</td></tr>
<tr><td>8,886,176 B2</td><td>11/2014</td><td>Luna et al.</td></tr>
<tr><td>8,990,685 B1</td><td>3/2015</td><td>Sandoval et al.</td></tr>
<tr><td>9,043,433 B2</td><td>5/2015</td><td>Backholm</td></tr>
<tr><td>9,049,179 B2</td><td>6/2015</td><td>Luna</td></tr>
<tr><td>9,111,309 B2</td><td>8/2015</td><td>Howard et al.</td></tr>
<tr><td>9,118,623 B2</td><td>8/2015</td><td>Devanneaux et al.</td></tr>
<tr><td>9,208,123 B2</td><td>12/2015</td><td>Luna</td></tr>
<tr><td>9,247,019 B2</td><td>1/2016</td><td>Luna et al.</td></tr>
<tr><td>9,256,484 B2</td><td>2/2016</td><td>Stanley-Marbell et al.</td></tr>
<tr><td>9,307,007 B2</td><td>4/2016</td><td>Kapadia et al.</td></tr>
<tr><td>9,392,393 B2</td><td>7/2016</td><td>Wood et al.</td></tr>
<tr><td>9,407,713 B2</td><td>8/2016</td><td>Luna et al.</td></tr>
<tr><td>9,641,591 B1*</td><td>5/2017</td><td>Kolam ................ H04L 67/1014</td></tr>
<tr><td>9,769,030 B1*</td><td>9/2017</td><td>Ramalingam ........... H04L 41/22</td></tr>
<tr><td>10,460,327 B2*</td><td>10/2019</td><td>Stefik .................... G06F 16/951</td></tr>
<tr><td>2001/0020248 A1</td><td>9/2001</td><td>Banga et al.</td></tr>
<tr><td>2003/0041306 A1</td><td>2/2003</td><td>Takahashi</td></tr>
<tr><td>2003/0188106 A1</td><td>10/2003</td><td>Cohen</td></tr>
<tr><td>2003/0204678 A1</td><td>10/2003</td><td>Lee</td></tr>
<tr><td>2004/0083348 A1</td><td>4/2004</td><td>Chang et al.</td></tr>
<tr><td>2004/0128346 A1</td><td>7/2004</td><td>Melamed et al.</td></tr>
<tr><td>2007/0082707 A1*</td><td>4/2007</td><td>Flynt .................. G06Q 30/0241<br>455/564</td></tr>
<tr><td>2009/0019153 A1</td><td>1/2009</td><td>Sebastian</td></tr>
<tr><td>2010/0030963 A1</td><td>2/2010</td><td>Marcu et al.</td></tr>
<tr><td>2010/0161717 A1</td><td>6/2010</td><td>Albrecht et al.</td></tr>
<tr><td>2010/0161831 A1</td><td>6/2010</td><td>Haas et al.</td></tr>
<tr><td>2010/0180081 A1</td><td>7/2010</td><td>Bose et al.</td></tr>
<tr><td>2010/0332589 A1</td><td>12/2010</td><td>Schwimer</td></tr>
<tr><td>2011/0060881 A1</td><td>3/2011</td><td>Gallagher</td></tr>
<tr><td>2012/0096129 A1*</td><td>4/2012</td><td>Green .................... G06F 16/972<br>709/219</td></tr>
<tr><td>2012/0112662 A1</td><td>5/2012</td><td>Hatley</td></tr>
<tr><td>2013/0124621 A1*</td><td>5/2013</td><td>Lepeska .............. G06F 16/9574<br>709/203</td></tr>
<tr><td>2013/0198338 A1*</td><td>8/2013</td><td>Pinto ................... H04L 67/2842<br>709/219</td></tr>
<tr><td>2013/0268733 A1</td><td>10/2013</td><td>Narayanan et al.</td></tr>
<tr><td>2013/0308856 A1*</td><td>11/2013</td><td>Carpenter .......... G06K 9/00335<br>382/164</td></tr>
<tr><td>2014/0101389 A1</td><td>4/2014</td><td>Nellans et al.</td></tr>
<tr><td>2014/0136951 A1*</td><td>5/2014</td><td>Kumar .................. G06F 40/106<br>715/234</td></tr>
<tr><td>2014/0164938 A1*</td><td>6/2014</td><td>Petterson .............. G06F 3/0482<br>715/739</td></tr>
<tr><td>2014/0215001 A1*</td><td>7/2014</td><td>Tucek ..................... H04W 4/18<br>709/213</td></tr>
<tr><td>2014/0362768 A1</td><td>12/2014</td><td>Wood et al.</td></tr>
<tr><td>2014/0364104 A1</td><td>12/2014</td><td>Wood et al.</td></tr>
<tr><td>2014/0366041 A1</td><td>12/2014</td><td>Stanley-Marbell et al.</td></tr>
<tr><td>2014/0366042 A1</td><td>12/2014</td><td>Chan et al.</td></tr>
<tr><td>2014/0372511 A1</td><td>12/2014</td><td>Kapadia et al.</td></tr>
<tr><td>2014/0373032 A1</td><td>12/2014</td><td>Merry et al.</td></tr>
<tr><td>2014/0379840 A1</td><td>12/2014</td><td>Dao</td></tr>
<tr><td>2015/0019686 A1</td><td>1/2015</td><td>Backholm</td></tr>
<tr><td>2015/0120821 A1</td><td>4/2015</td><td>Bendell et al.</td></tr>
<tr><td>2015/0186443 A1*</td><td>7/2015</td><td>Ito .......................... G06F 16/29<br>707/618</td></tr>
<tr><td>2015/0241941 A1</td><td>8/2015</td><td>Luna et al.</td></tr>
<tr><td>2015/0256641 A1</td><td>9/2015</td><td>Agarwal et al.</td></tr>
<tr><td>2015/0296505 A1</td><td>10/2015</td><td>Luna et al.</td></tr>
<tr><td>2015/0347204 A1</td><td>12/2015</td><td>Stanley-Marbell et al.</td></tr>
<tr><td>2015/0347205 A1</td><td>12/2015</td><td>Stanley-Marbell et al.</td></tr>
<tr><td>2015/0347907 A1</td><td>12/2015</td><td>Mathew et al.</td></tr>
<tr><td>2015/0347908 A1</td><td>12/2015</td><td>Mathew et al.</td></tr>
<tr><td>2015/0350807 A1</td><td>12/2015</td><td>Andrews et al.</td></tr>
<tr><td>2015/0350885 A1</td><td>12/2015</td><td>Stanley-Marbell et al.</td></tr>
<tr><td>2015/0351033 A1</td><td>12/2015</td><td>Stanley-Marbell et al.</td></tr>
<tr><td>2015/0356259 A1</td><td>12/2015</td><td>Park</td></tr>
<tr><td>2015/0365904 A1</td><td>12/2015</td><td>Luna et al.</td></tr>
<tr><td>2016/0021211 A1*</td><td>1/2016</td><td>Yellin ..................... H04L 67/16<br>709/203</td></tr>
<tr><td>2016/0191651 A1</td><td>6/2016</td><td>Balakrishnan et al.</td></tr>
<tr><td>2016/0191664 A1</td><td>6/2016</td><td>Balakrishnan et al.</td></tr>
<tr><td>2016/0205028 A1</td><td>7/2016</td><td>Luna et al.</td></tr>
<tr><td>2017/0111465 A1</td><td>4/2017</td><td>Yellin et al.</td></tr>
<tr><td>2017/0221109 A1*</td><td>8/2017</td><td>Liu ...................... G06F 16/9574</td></tr>
<tr><td>2017/0315689 A1*</td><td>11/2017</td><td>Myhre .................. G06F 3/0482</td></tr>
<tr><td>2017/0359434 A1*</td><td>12/2017</td><td>Desjardins .......... G06F 16/9574</td></tr>
</table>

OTHER PUBLICATIONS

Andraus et al., "File Prefetching for Mobile Devices Using On-Line Learning", pp. 1-10, Aug. 2008.
U.S. Appl. No. 15/279,488 office action dated Feb. 14, 2020.
Fielding et al., "Hypertext Transfer Protocol (HTTP/1.1)", Networking Group, Requests for Comments 2616, pp. 1-18, Jun. 1999.
International Application No. PCT/IB2018/054460 Search Report dated Sep. 17, 2018.
Chinese Application No. 201680050956X Office Action dated Jun. 19, 2020.

* cited by examiner

SILENT UPDATING OF CONTENT IN USER DEVICES

CROSS-REFERENCE TO RELATED APPLICATIONS

This application is U.S. National Phase of PCT Application PCT/IB2018/054460, filed Jun. 18, 2018, which claims the benefit of U.S. Provisional Patent Application 62/521,563, filed Jun. 19, 2017, and of U.S. Provisional Patent Application 62/572,494, filed Oct. 15, 2017. The disclosures of these related applications are incorporated herein by reference.

FIELD OF THE INVENTION

The present invention relates generally to communication systems, and particularly to methods and systems for delivering and presenting content in user devices.

BACKGROUND OF THE INVENTION

Various techniques are known in the art for delivering content to user devices. For example, U.S. Pat. No. 8,601,052 describes a method and system for performing content prefetching for a wireless portable computing device (PCD).

As another example, U.S. Patent Application Publication 2010/0161831 describes a content and traffic managing system. A mobile device is connectable to users and to content providers via communication links. The system tracks various parameters over time, and schedules communication in relation to predefined or projected content responsive to user content-related behavior, user communication behavior, user external behavior, and parameters of communication links.

U.S. Patent Application Publication 2016/0021211, whose disclosure is incorporated herein by reference, describes a method for content delivery that includes including defining a guaranteed prefetching mode, in which content is continuously prefetched from a content source to a communication terminal of a user so as to maintain the communication terminal synchronized with the content source. One or more time-of-day intervals, during which the user is expected to access given content, are identified. During the identified time-of-day intervals, the given content is prefetched from the content source to the communication terminal using the guaranteed prefetching mode.

SUMMARY OF THE INVENTION

An embodiment of the present invention that is described herein provides an apparatus for content delivery, including a network interface and one or more processors. The network interface is configured for communicating over a communication network. The one or more processors are configured to receive from a user of a user device a request to access a User-Interface (UI) unit that includes one or more content items, to initially display, in response to the request, the UI unit to the user with versions of the content items that are available for immediate display in the user device, regardless of whether the initially displayed versions are up-to-date or not, and, for at least a content item whose initially displayed version is not up-to-date, to obtain an up-to-date version of the content item, and merge the up-to-date version of the content item transparently to the user into the UI unit being displayed, to replace the initially displayed version.

In an embodiment, the one or more processors are configured to merge the up-to-date version of the content item into the UI unit by replacing only visible pixels belonging to the content item, while retaining initially-displayed pixels that do not belong to the content item. In an example embodiment, only a partial range of the UI unit is visible to the user at a given time, and the one or more processors are configured to merge the up-to-date version of the content item into the UI unit without making a different partial range visible to the user. In a disclosed embodiment, the one or more processors are configured to replace the initially displayed version of the content item with the up-to-date version, without generating to the user any indication that the initially displayed version has been replaced.

In some embodiments, the one or more processors are configured to merge the up-to-date version of the content item into the UI unit only if the content item is outside a range of the UI unit that is currently visible to the user. In an embodiment, the one or more processors are configured to merge the up-to-date version of the content item into the UI unit only if the content item is not visible to the user without scrolling. In an embodiment, the one or more processors are configured to initially display a version of the content item that has been prefetched to the user device, and to fetch the up-to-date version over the communication network in response to the request. In another embodiment, the one or more processors are configured to initially display a version of the content item that is cached in a cache memory of the user device, and to fetch the up-to-date version over the communication network.

In an example embodiment, the one or more processors are configured to initially display a version of the content item that is preloaded or pre-rendered in the user device, and to subsequently perform one or more of loading and rendering the up-to-date version. In another embodiment, the processors are configured to decide whether or not to obtain and merge an up-to-date version of a given content item, depending on a visibility metric that is indicative of one or more of (i) a time duration and (ii) an amount of user actions, needed to make the given content item visible to the user. In an embodiment, the processors are configured to assess the visibility metric relative to one or more of (i) an absolute location of the given content item in the UI unit, (ii) a position of the given content item relative to a portion of the UI unit that is currently displayed on a screen of the user device, (iii) a position of the given content item relative to a launcher of an app, (iv) a position of the given content item relative to a Home screen of a launcher of the user device and (v) a position of the given content item relative to a landing page of an app.

In a disclosed embodiment, the processors are configured to prefetch the up-to-date version before the user requests to access the UI unit, in response to assessing that the up-to-date version can be prefetched using less than a predefined amount of a given resource. In an embodiment, the processors are configured to prefetch the up-to-date version before the user requests to access the UI unit, in response to assessing that a likelihood of the user requesting to access the UI unit is higher than a predefined threshold. In another embodiment, when the content item is unavailable for immediate display, the one or more processors are configured to initially display a placeholder content item in place of the content item, and to replace the placeholder content item with the up-to-date version.

In some embodiments, the initially displayed version of the content item in not up-to-date because the content item has not been defined as subject to prefetching. In other embodiments, the initially displayed version of the content item in not up-to-date because the content item has been prefetched using best-effort prefetching and not guaranteed prefetching. In yet other embodiments, the initially displayed version of the content item in not up-to-date because of an error in prefetching the content item.

In some embodiments, the one or more processors are configured to obtain and merge the up-to-date version for one or more of: (i) all content items for which the version available for immediate display in the user device is not up-to-date, (ii) at least some of the content items that are not currently visible to the user and for which the version available for immediate display in the user device is not up-to-date, and (iii) one or more content items that are defined as subject for "hit and update."

There is additionally provided, in accordance with an embodiment of the present invention, a method for content delivery including receiving from a user of a user device a request to access a User-Interface (UI) unit that comprises one or more content items. In response to the request, the UI unit is initially displayed to the user with versions of the content items that are available for immediate display in the user device, regardless of whether the initially displayed versions are up-to-date or not. For at least a content item, whose initially displayed version is not up-to-date, an up-to-date version of the content item is obtained, and the up-to-date version of the content item is merged transparently to the user into the UI unit being displayed, to replace the initially displayed version.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for delivering content to user devices in communication networks. The disclosed techniques involve a "silent updating" process in which the display of a user device is updated to present an up-to-date version of the content transparently to the user.

In some disclosed embodiments, a system comprises a user device that consumes content items from one or more content sources over a communication network. One or more processors in the system, in the user device and/or on the network side, deliver content items to the user device and display the content items to the user.

In some embodiments, the processors receive from a user of a user device a request to access a User-Interface (UI) unit that comprises one or more content items. The UI unit may comprise, for example, a Web page or an application ("app") feed. The UI unit might comprise multiple types of content items, such as textual content, images and/or videos. In response to the request, the processors initially display the UI unit to the user with versions of the content items that are available for immediate display in the user device, regardless of whether the initially displayed versions are up-to-date or not. The locally available versions may be, for example, cached in a cache memory of the user device due to prefetching or past viewing, or they may have been preloaded or pre-rendered in the background in order to reduce latency. For at least one content item, whose initially displayed version is not up-to-date, the processors obtain an up-to-date version of the content item, and replace the initially displayed version with the up-to-date version. This process is referred to herein as "Hit and Update."

Moreover, in some embodiments the processors carry out the "Hit and Update" process transparently to the user. In other words, the processors merge the up-to-date version of the content item transparently to the user into the UI unit being displayed, so as to replace the initially displayed version. For example, the processors may replace only the visible pixels that belong to the content items being updated. As another example, the processors may refrain from outputting any indication indicative of the update, e.g., screen flicker or spinning wheel. As yet another example, the processors may refrain from moving the portion of the UI unit that is currently visible to the user (e.g., refrain from jumping back to the top of a Web page upon updating).

The disclosed "silent Hit and Update" techniques are highly effective in reducing the perceived latency of content display, and generally improve user experience.

Although the embodiments described herein refer mainly to prefetching, the disclosed techniques are applicable to various other types of preloading, e.g., pre-rendering. In the present context, the term "preloading" refers to any scheme that makes content available for immediate display in the user device. Preloading operations may comprise, for example, loading code and/or content of an app into RAM, running code of an app in the background at the user device, and/or pre-rendering content items in the background at the user device. Prefetching is thus viewed as a special case of preloading. Any of the "silent Hit and Update" techniques described herein in the context of prefetching can also be applied to pre-rendering or to any other kind of preloading operation.

The "silent Hit and Update" technique can be used in various use-cases in the context of a prefetching system. For example, the processors can use "silent Hit and Update" for delivering content items that are not assigned for prefetching, for compensating for prefetching operations that do not keep the prefetched content 100% synchronized with the content source (e.g., best-effort prefetching), and/or for correcting errors or misses of the prefetching operation.

In some embodiments, the processors use prefetching for ensuring fast presentation of at least some of the visible part of the UI unit. In this context, the term "visible part" refers also to a part of the UI unit that is close to visibility within a predefined metric. This prefetching may be performed using guaranteed prefetching or using best-effort prefetching, for example. In these embodiments, the processors do not prefetch at least some of the non-visible part of the UI unit (not using guaranteed prefetching, and possibly not even using best-effort prefetching). In this context, the term "non-visible part" refers also to a part that is far from visibility within a predefined metric. The processors use "silent Hit and Update" for compensating for at least some of the content items that are not available (or at least whose up-to-date versions are not available) at the user device. In some of these embodiments, some of the content may be updated using non-silent Hit and Update and/or using conventional, real-time fetching.

System Description

Figure 1:
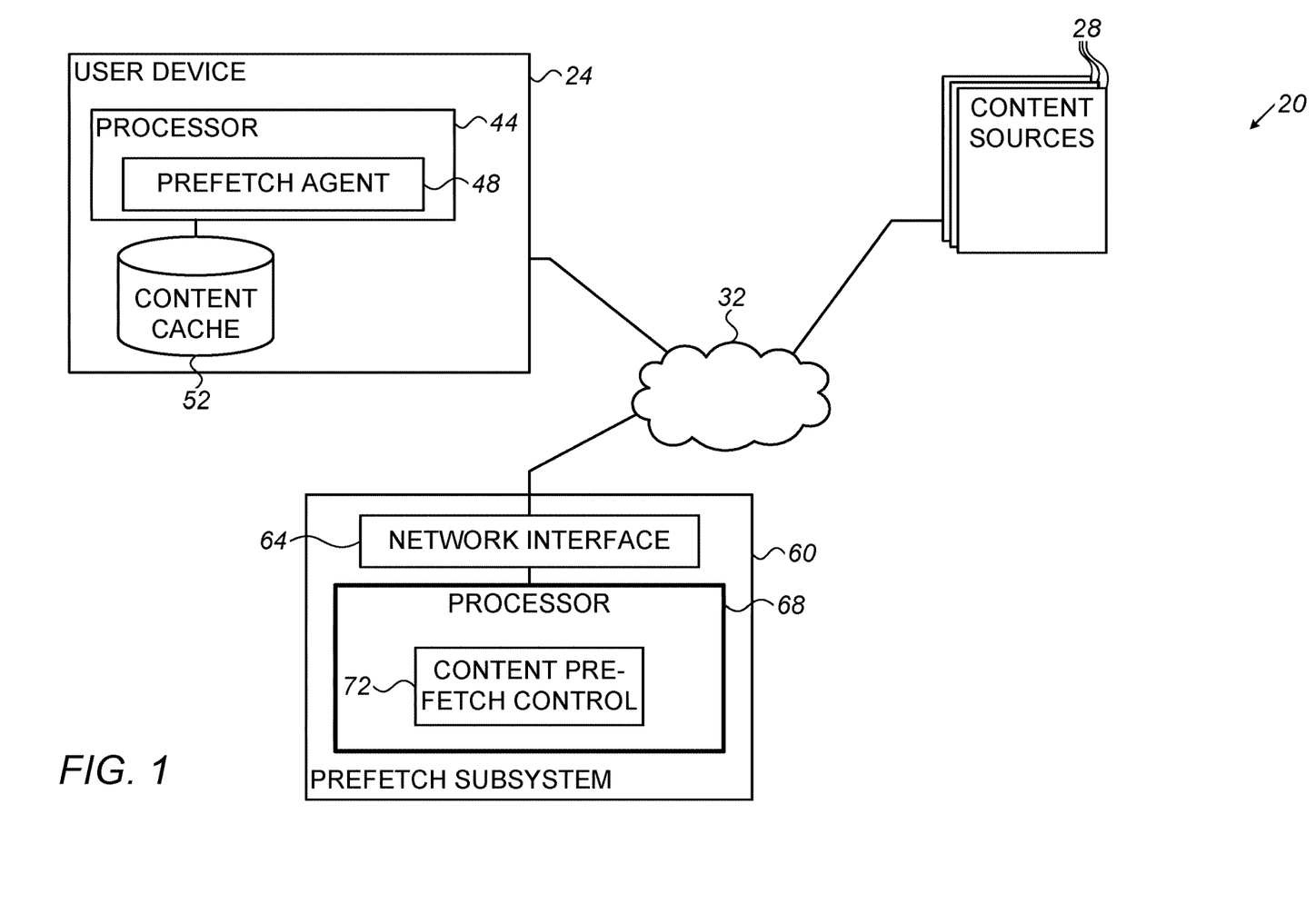
FIG. 1 is a block diagram that schematically illustrates a content delivery system, in accordance with an embodiment of the present invention.

FIG. 1 is a block diagram that schematically illustrates a content delivery system 20, in accordance with an embodiment of the present invention. The configuration of system 20 is one example configuration. Several alternative configurations are described further below.

System 20 comprises a user device 24 that accesses and consumes content items provided by one or more content sources 28 over a network 32. Device 24 may comprise any suitable wireless or wireline device, such as, for example, a cellular phone or smartphone, a wireless-enabled laptop or tablet computer, a desktop personal computer, or any other suitable type of user device that is capable of communicating over a network and presenting content to a user. User device 24 may consume content using any suitable software, e.g., a browser or dedicated application. The figure shows a single user device 24 for the sake of clarity. Real-life systems typically comprise a large number of user devices of various kinds.

Network 32 may comprise, for example a Wide Area Network (WAN) such as the Internet, a Local Area Network (LAN), a wireless network such as a cellular network or Wireless LAN (WLAN), or any other suitable network or combination of networks.

Content sources 28 may comprise, for example, Web content servers, or any other suitable sources of content. The disclosed techniques can be used with any suitable types of content items, such as, for example, Web pages, audio or video clips, html files, java scripts and/or CSS files, to name just a few examples.

In some embodiments, system 20 performs prefetching of content items to user device 24. In the present example, user device 24 comprises a processor 44 that carries out the various processing tasks of the user device. Among other tasks, processor 44 runs a software component referred to as a prefetch agent 48, which handles prefetching of content items. In addition, user device 24 comprises a content cache 52 for caching prefetched content items. Cache 52 is typically managed by prefetch agent 48.

Typically, prefetch agent 48 receives prefetched content items and stores them in content cache 52. Prefetch agent 48 may intercept user requests to access content items, and determine whether a requested item already resides in the cache. If so, the prefetch agent may retrieve the requested content item from the content cache. Otherwise, the prefetch agent would typically retrieve the requested content item from content sources 28 over network 32. In an embodiment, prefetch agent 48 may also assist in tracking historical usage patterns, and other relevant data related to the user device, which can be used as inputs for specifying prefetch policies for content.

User device 24 typically also comprises a suitable network interface (not shown in the figure) for connecting to network 32. This network interface may be wired (e.g., an Ethernet Network Interface Controller—NIC) or wireless (e.g., a cellular modem or a Wi-Fi modem). Typically, user device 24 further comprises some internal memory (not shown in the figure) that is used for storing relevant information, such as the applicable prefetch policy.

In the embodiment of FIG. 1, system 20 further comprises a prefetching subsystem 60 that performs the various content prefetching tasks on the network side. Subsystem 60 comprises a network interface 64 for communicating over network 32, and a processor 68 that carries out the various processing tasks of the prefetching subsystem. In the present example, processor 68 runs a Content Prefetching Control unit (CPC) 72 that carries out content prefetching.

In an example embodiment, CPC 72 defines a prefetch policy, which specifies how content is to be prefetched to user device 24. For example, CPC 72 may determine which content items are to be prefetched from content sources 28 to content cache 52, e.g., based on the likelihood that the user will request the content items. The CPC may determine the appropriate time for prefetching content items, e.g., based on a prediction of the time the user is expected to request them, and/or availability of communication resources. The CPC may determine how content items are to be delivered to cache 52, e.g., over a Wi-Fi or cellular connection. As yet another example, the CPC may determine the format with which content items are to be delivered to the user device, e.g., whether and how to perform compression or to deliver only changes for the case of content already prefetched (i.e., differential prefetch updates).

In various embodiments, as part of applying the prefetch policy, CPC 72 may estimate, for each content item, the likelihood that the user of user device 24 will request access to the content item. Such likelihood metrics can be sent to user device 24, and may be used by prefetch agent 48 in ranking prefetch priorities for the different content items. The likelihood estimation in CPC 72 may take into account various factors. Some factors may be user-related (e.g., gender, geographical location, interests, and/or recent and historical Internet activity). Other factors may be environment-related (e.g., time-of-day, road traffic conditions, weather, current events, and/or sporting occasions). Yet other factors may be content-related (e.g., content topic or category, content keywords, identity of the content source, and/or the current popularity or rating of the content).

In some embodiments, CPC 72 estimates the time the user is likely to access a content item in order to help determine the prefetch priorities of the various content items and/or the timing of the prefetch. These time estimates might be separately specified as part of the prefetch policy sent to the device, or they might be incorporated into likelihood metrics themselves. For example, a content item that is likely to be accessed within one hour might be given a higher likelihood metric than a content item that will not be needed for at least two hours.

Additionally or alternatively to the likelihood of the user accessing the content, other factors that CPC 72 may consider in specifying the prefetch policy may comprise power consumption considerations (e.g., preference to prefetch while a Wi-Fi connection or a strong cellular connection is available), transmission cost considerations (e.g., preference to lower-cost data transfer times), network congestion and server load considerations (e.g., preference to prefetch during off-peak traffic hours), and/or other user-related or network-related considerations.

Further additionally or alternatively, in specifying the prefetch policy, CPC 72 may associate certain times-of-day with respective prefetch priority levels. This association may be performed separately for different apps or content sources, or jointly for multiple apps or content sources. One example factor in determining the prefetch priority levels is the estimated likelihood of the user accessing the different apps or content sources during various times-of-day. Assigning a high priority to a prefetch operation typically translates to the prefetch operation being likely to occur (possibly conditioned on certain constraints or limitations).

Certain aspects of content prefetching, and content prefetching schemes that can be used by subsystem 60 and agent 48, are addressed in U.S. Patent Application Publication 2016/0021211, cited above. For example, CPC 72 may choose between various prefetching modes, e.g., a guaranteed prefetching mode and a best-effort prefetching mode. In the guaranteed prefetching mode, CPC 72 continuously tracks changes in content on content sources 28 (e.g., at predefined tracking intervals) and ensures that content cache 52 in user device 24 is regularly updated by prefetching to be synchronized with the content sources (e.g., at predefined guaranteed-mode prefetching intervals). In the best-effort mode, the CPC typically performs prefetching only as feasible using the available resources. For example, in the best-effort mode, prefetching may be restricted to scenarios in which a particularly robust network connection exists, or limited to scenarios that do not involve a cellular connection. The guaranteed prefetching mode may be utilized during one or more time-of-day intervals in which the likelihood of a user accessing a content source has been predicted to be high. Other considerations that can affect the choice between the guaranteed and best-effort modes can be based on various prefetching policy considerations, e.g., power consumption, transmission cost, network congestion and/or server load. The choice of mode can also be made separately for different applications and/or content sources.

In some embodiments, CPC 72 regularly monitors content sources 28 and generates a "prefetch catalog"—a catalog of content items available for prefetching. Each content item is represented in the catalog by an identifier (ID) and a version number indication. The version numbers enable CPC 72 and/or prefetch agent 48 to determine, for example, whether a certain content item has changed relative to the version cached in cache 52 of user device 24. The catalog may also comprise the likelihood metrics described above, links or addresses from which the content items can be retrieved, and/or any other relevant information. The catalog is considered part of the prefetch policy, along with any other prefetch rules, strategies, thresholds or other policy matters defined by CPC 72.

The configurations of system 20 and its various elements shown in FIG. 1 are example configurations, which are chosen purely for the sake of conceptual clarity. In alternative embodiments, any other suitable configurations can be used. For example, the functions of prefetching subsystem 60 can be implemented using any desired number of processors, or even in a single processor. The various functions of subsystem 60 can be partitioned among the processors in any suitable way. In another embodiment, some or all of the functions of subsystem 60 may be performed by agent 48 in user device 24.

As another example, prefetch agent 48 may be implemented in a software module running on processor 44, in an application running on processor 44, in a Software Development Kit (SDK) embedded in an application running on processor 44, by the Operating System (OS) running on processor 44, or in any other suitable manner. In an embodiment, processor 44 may run a proxy server, which is controlled by prefetch agent 48 and is exposed to incoming and outgoing traffic. Further alternatively, the functionality of prefetch agent 48 can be implemented entirely on the network side without an agent on user device 24.

Generally, the functions of the different systems elements described herein (e.g., prefetch agent, content sources and elements of subsystem 60) can be partitioned in any other suitable way. Thus, in the context of the present patent application and in the claims, the disclosed techniques are carried out by one or more processors. The processors may reside in user device 24, and/or on the network side such as in subsystem 60 and/or in content sources 28.

Although the embodiments described herein refer mainly to human users, the term "user" refers to machine users, as well. Machine users may comprise, for example, various host systems that use wireless communication, such as in various Internet-of-Things (IoT) applications.

The different elements of system 20 may be implemented using suitable software, using suitable hardware, e.g., using one or more Application-Specific Integrated Circuits (ASICs) or Field-Programmable Gate Arrays (FPGAs), or using a combination of hardware and software elements. Cache 52 may be implemented using one or more memory or storage devices of any suitable type. In some embodiments, agent 48 and/or subsystem 60 may be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Silent Updating of Content Items in a
User-Interface Unit

In some embodiments, a set of content items together make-up a certain User Interface (UI) unit. A UI unit may comprise, for example, a screen window, an Android activity, a Web page, a browser tab, a media player window, or any other suitable type of UI unit that is presented to a user. A UI unit is also referred to herein as a UI display. A UI unit comprises one or more content items, typically multiple content items of various types. Content items in a UI unit may comprise, for example, textual content items, still images, audio clips, video clips, executable scripts, or any other suitable type of content items. In accordance with the definition of the UI unit, the content items are to be rendered on the display of user device 24 in a certain manner.

At a certain point in time, a user of a user device 24 requests to access the UI unit, e.g., by clicking a hyperlink or entering any other suitable input to the user device. At this point in time, it may happen that one or more of the content item associated with the UI interface are already available for immediate display in the user device. For example, content items may have been prefetched to cache 52 of the user device, or fetched in real-time when the user accessed the UI interface in the past. As another example, processor 44 may have pre-loaded and/or pre-rendered certain content items (e.g., in-app content, app feed and/or landing page) in the background, and these content items are ready to be switched to the foreground and displayed to the user. In the context of the present patent application and in the claims, the term "a content item ready for immediate display" refers to any such scenario, e.g., a content item that is cached in cache 52 of the user device, preloaded to memory in the user device, and/or pre-rendered.

In the present context, the term "preloading an app" refers to various actions associated with loading of content for an app before the user accessing the content. Example preloading action may comprise:

Fetching content or data for the app over network 32.

Rendering or partially rendering a visual display (e.g., screen) associated with the app in the background.

Other user device activities related to app loading or in-app loading, such as loading the app code and/or app data into RAM from memory, initializing the operating-system process associated with the app's instance, running one or more initial components of the code (e.g., the code associated with the Android Application class) and/or fetching DNS information.

In the present context, fetching of content in advance in the background is referred to as pre-fetch, performing rendering in advance in the background is referred to as pre-rendering, and executing any activities related to app loading or in-app loading in advance in the background (possibly including pre-fetch and/or pre-render) is referred to as preloading. When content is pre-rendered, the visual display (the user interface) containing the content is rendered in the background in advance of the user accessing it. Thus, when the user accesses the display, the pre-rendered display is immediately switched to the foreground without the typical user-device processing required for rendering the display.

In some embodiments, one or more of the processors in system 20 (e.g., processor 68 in prefetch subsystem 60, processor 44 in user device 24, and/or a processor in a content source 28) deliver and present the UI unit to the user of user device 24 using a "Hit and Update" scheme. Consider a scenario in which, when the user requests to access the UI unit, one or more of the content items of the UI unit happen to be available for immediate display (e.g., cached in cache 52). There is no guarantee, however, that these content items are fresh (valid), i.e., that the versions of the content items that are being presented to the user are the most up-to-date versions.

In a "Hit and Update" scheme, the processors immediately present the UI unit to the user with the versions of the content items that are available for display (even though one or more of the content items may not be fresh). In parallel, the processors check whether the versions being presented are the most up-to-date versions. If not, the processors obtain the up-to-date versions (e.g., fetch the up-to-date versions over the network) and update the UI unit to present the updated versions.

Further aspects of "Hit and Update" schemes are addressed in U.S. Patent Application Publication 2017/0111465, entitled "Freshness-aware presentation of content in communication terminals," which is assigned to the assignee of the present patent application and whose disclosure is incorporated herein by reference.

In the disclosed embodiments, the processors perform the "Hit and Update" process in a manner that is transparent to the user. Such a process is referred to herein as a "silent update." After obtaining the up-to-date version of a content item, the processors merge the up-to-date version into the UI unit being displayed, so as to replace the initially displayed version transparently. In some cases, e.g., when the content being updated is "below the fold" or otherwise not currently visible to the user, the silent update is entirely unnoticeable to the user. In other cases, the update has only a minimal noticeable effect, other than the desired change in content.

In some embodiments, the processors achieve a silent update by replacing, in the UI unit being displayed, only the visible pixels that belong to the content item or items being updated. Other visible pixels, which do not belong to content items whose versions are being updated, remain unchanged.

In some embodiments, the processors achieve a silent update by refraining from outputting to the user any indication of the replacement. For example, the processors typically do not indicate to the user that the initially-displayed content is not fresh. The processors typically also do not indicate to the user that content replacement is performed (e.g., avoid screen flickers, spinning when or other visual or audio indication).

In many practical cases, only a partial range of the UI unit is visible to the user on the user device screen at a given time. Some content updates, e.g., refreshing of a Web page, are commonly accompanied by a jump to the beginning of the page. This sort of jump also serves, intentionally or unintentionally, as an indication to the user that the displayed content has been updated. In some embodiments, the processors achieve a silent update by retaining the same portion of the UI unit visible to the user. In other words, although content has been updated, the update is not accompanied by a jump or scroll that makes a different portion (top or otherwise) of the UI unit visible to the user.

Additionally or alternatively, the processors may update one or more content items transparently to the user using any other suitable technique.

Figure 2:
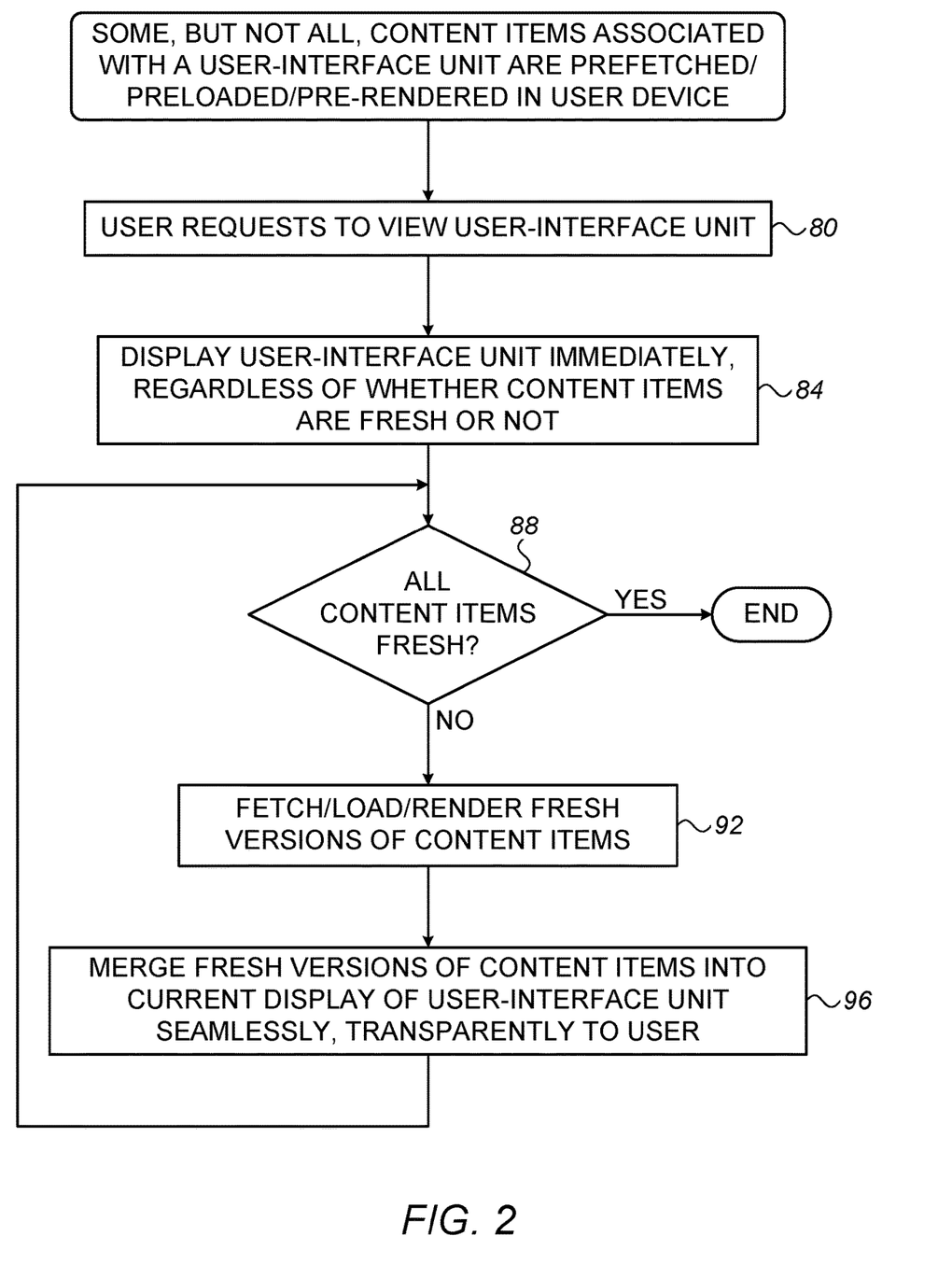
FIG. 2 is a flow chart that schematically illustrates a method for silent updating of content, in accordance with an embodiment of the present invention.

FIG. 2 is a flow chart that schematically illustrates a method for silent updating of content, in accordance with an embodiment of the present invention. The method begins in a situation in which one or more, but not all, content items in a UI unit are available for immediate display in user device 24. These content items may have been, for example, prefetched or fetched to cache 52, preloaded or pre-rendered.

At a requesting step 80, the user requests to access the UI interface. Immediately in response to the request, the processors display the UI unit on the user device screen, at an initial displaying step 84. For the initial display, the processors use the immediately-available versions of the content items of the UI unit, regardless of whether their versions are up-to-date.

In an embodiment, in the initial display the processors use a dummy "placeholder" content item in place of a content item that is not available for display. This is an example in which "silent Hit and Update" is applied to a content item that is not available at all in the user device (not merely having a non-up-to-date version available). Other examples are also possible. For example, when the content item in question is not currently visible, even a dummy placeholder content item may be unnecessary.

At a freshness checking step 88, the processors check whether all the versions of the content items in the initial display are the most up-to-date versions. If so, the method ends. Otherwise, if one or more versions in the initial display are found not up-to-date, the processors obtain (e.g., fetch, load or render) the most up-to-date versions of these content items, at a version updating step 92. At a display updating step 96, the processors merge the up-to-date versions of the content items transparently to the user into the UI unit being displayed, to replace the initially displayed versions. The method then loops back to step 88 above. Note that, typically, only content items defined as subject to "Hit and Update" will be updated. Other content items may not be updated, even if they are not up-to-date. In some cases, some content items in the UI unit are defined as subject to "Hit and Update," while others are not. In other cases, all the content items in the UI unit are defined as subject to "Hit and Update." while others are not. In yet other cases, at least some content items are defined as subject to "Hit and Update" when in the non-visible part of the UI unit.

Selection Criteria for Content Items to be Silently Updated

In some embodiments, one or more of the processors of system 20 (e.g., processor 68 in prefetch subsystem 60, processor 44 in user device 24, and/or a processor in a content source 28) silently-update only a subset of the non-up-to-date content items, according to a predefined selection criterion. Various selection criteria can be used for this purpose.

For example, in some embodiments the processors decide whether or not to silently-update a certain content item depending on the location of the content item in the UI unit. For example, the processors may decide to silently-update the content items that are not immediately visible to the user when presented on user device 24 as part of the UI unit. In the present context, the term "visible" refers to content that is displayed "above the fold," i.e., without requiring the user to scroll in order to view it. In the present context, the term "location of a content item in the UI unit" is a static property of the content item, and does not depend on the specific portion of the UI unit that the user is currently viewing. In another embodiment, silent update may be applied only to some or all of the content items that are "above the fold"—i.e., initially visible in the UI unit.

In another embodiment, the processors may decide to silently-update a content item depending on the location of the content item relative to the current display of the UI unit on user device 24. In the present context, the term "location of a content item relative to the current display" is a dynamic characteristic, and depends on the specific portion of the UI unit that the user is currently viewing. In an example embodiment, the processors silently-update content items that are not currently visible on the user device screen, according to the current display. In another embodiment, silent update may be applied only to some or all of the content items that are currently visible, per the current display.

In the two examples above, a content item is either "visible" or "not visible." Such a decision can be viewed as a binary "visibility metric." In another example of a decision based on a binary visibility metric, the processors decide to not silently-update a certain content item if the content item can become visible within up to N scrolling actions by the user. If the content item cannot become visible within up to N scrolling actions, the processors decide to silently-update it.

In some embodiments, the processors decide whether or not to silently-update a certain content item based on a soft "visibility metric" that quantifies the "distance from visibility" of the content item. The visibility metric is indicative of the amount of user actions and/or time needed at the user device in order to make the content item in question visible to the user.

For any such visibility metric, in some embodiments the processors decide to silently-update a content item if the visibility metric indicates that the content item is far from visibility by more than a certain threshold T.

The processors may use various kinds of soft visibility metrics. Several non-limiting examples of visibility metrics comprise the following:

Visibility metrics derived from the location of the content item within the UI unit. For example, a content item that is visible on a Web page without scrolling may be assigned a higher visibility metric, while a content item that is not visible without scrolling may be given a lower visibility metric. An another example, a content item that is visible in less than a predefined amount of scrolling may be assigned a high visibility metric, while a content item requiring more than the predefined amount of scrolling to be viewed may be assigned a low metric.

Visibility metrics derived from the level of accessibility of the content item within the current display (the currently displayed portion) of the UI unit. For example, a content item that is visible to the user on the current display may be assigned a high visibility metric, and vice versa (i.e., content that is not visible to the user on the current display may be assigned a low visibility metric). As another example, a content item that can be made visible from the current display with less than a predefined amount of scrolling may be assigned a high visibility metric. A content item that requires more than the predefined amount of scrolling to be made visible (starting from the current display) may be assigned a low visibility metric.

Visibility metrics derived from the number of user actions, starting from the current display until the content item is accessible. For example, a content item that can become visible from the current display with less than a predefined amount of user actions may be assigned a high visibility metric, and vice versa. In this context, user actions may comprise, for example, clicks on hyperlinks, checking of check-boxes, scrolls, drop-down menu selections, or any other suitable actions.

Visibility metrics derived from the time duration that elapses until the content item causes a change in the UI, e.g., until the content item becomes visible. For example, a content item that can become visible within a short amount of time (e.g., below a predefined threshold) may be assigned a high visibility metric, and vice versa. In an example embodiment, content that is available near the beginning of a video or audio file (or e.g., contained within one of the first HLS frames of the video) can be assigned a high visibility metric, as opposed to content located later in the file. In another embodiment, content that is available following a click that usually responds in less than ten seconds (due to app processing, not network latency) can be assigned a high visibility metric, as opposed to content that becomes available after clicks that are slower to respond. The visibility metric may also be defined as some function of the amount of time until the content becomes accessible. Another example is a content item that is scheduled to change the UI a certain predefined times.

Visibility metrics relative to a predefined starting point. An example starting point is a launcher of an application ("app"). For example, content that is available after one user action (e.g., click) from the launcher can be assigned a high visibility metric, whereas content that requires a larger number of user actions from the launcher may be assigned a lower metric. As another example, content that is available from the Home screen of the launcher (e.g., by clicking on an app icon available from the Home screen) might be assigned a lower visibility metric than content that is available from other launcher screens (e.g., by clicking on an app icon after scrolling to one of the other launcher screens). Another example starting point is the landing page of an app (including, for example, a home screen of a browser). For example, content that is available from the landing page without any user actions may be assigned a high visibility metric, and vice versa.

Visibility metrics based on combinations of the above metrics. For example, content that is available on the landing page of an app without scrolling may be assigned a high visibility metric, and vice versa. As another example, the first three HLS frames of video content that is available from a landing page of an app may be assigned a high visibility metric, and vice versa.

The list of metrics above is given purely by way of example. In alternative embodiments, any other suitable visibility metric can be used. For example, any number of visibility metrics (described above or otherwise) can be combined in any manner and used as a visibility metric. As another example, the visibility metric may be formulated as a distance metric, in which smaller values indicate content items closer to visibility, and higher values correspond to content items requiring more time and/or user action to be viewed. In an embodiment, a content item in the UI unit is a video link, i.e., a hyperlink leading to a video. The visibility metrics above, e.g., location within the current display, may apply to the location of such a video link in the UI unit.

In some embodiments, as part of the silent update process, the processors prefetch the up-to-date version of a content item opportunistically, before the user requests to access the UI unit. In the present context, the term "opportunistically" means that the processors identify circumstances in which it is possible to prefetch content items with only a small investment in system resources (e.g., if the battery power or data-plan cost necessary for this prefetch operation are below a predefined amount).

For example, the processors may decide to prefetch content items of the second subset depending on factors such as:
Modem activity (e.g., whether the modem of the user device is active anyhow for another purpose)
Data-transfer status, e.g., depending on the amount of other data being transferred relative to the data transfer capacity available (i.e., relative to potential efficiencies achievable by coordinating the potential prefetch with other current data transfers taking place, including other prefetches).
Wireless channel quality (e.g., when reception quality is exceptionally high).
Network type (e.g., when a Wi-Fi connection is available, as opposed to a cellular connection)
Network conditions (e.g., when experiencing high throughput or small latency).

In yet another example, the processors may decide to prefetch an up-to-date version of a content item in response to assessing that the likelihood that the user will request to access the UI unit exceeds some predefined threshold.

In an embodiment, when prefetching up-to-date versions of content based on other factors, if the UI unit is preloaded or pre-rendered in the background in user device 24, the processors may refresh the preloaded or pre-rendered content transparently in the background, as well.

The "silent Hit and Update" techniques described herein can be used in various use-cases. In the context of a prefetching system, the processors can use "silent Hit and Update," for example for the following:
Fetching and updating content items that are not assigned to be prefetched.
Compensating for imperfect prefetching operations (e.g., best effort prefetching as opposed to guaranteed prefetching mode) that do not keep the prefetched content perfectly synchronized with the content source.
Correcting errors or misses of the prefetching operation.

In other words, the version that is available for immediate display in the user device may be non-up-to-date for any of the above reasons. The disclosed silent update techniques can be used to obtain and display the up-to-date version, regardless of the reason for the lack of freshness.

Although the embodiments described herein mainly address wireless user devices, i.e., user devices connected via a wireless link, the methods and systems described herein can also be used with wired user devices that are connected to the network via wired links, e.g., desktop computers.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus for content delivery, comprising:
a network interface for communicating over a communication network; and
one or more processors, configured to:
receive from a user of a user device a request to access a User-Interface (UI) unit that comprises one or more content items;
in response to the request, initially display the UI unit to the user with versions of the content items that are available for immediate display in the user device, regardless of whether the initially displayed versions are up-to-date or not, wherein the displayed UI unit has a first range that is visible to the user and a second range that is invisible to the user; and
for at least a content item, which is part of the UI unit and whose initially displayed version is not up-to-date:
obtain an up-to-date version of the content item;
determine whether the content item is in the second range of the UI unit that is currently invisible to the user; and
only if the content item is part of the UI unit but is in the second range of the UI unit that is currently invisible to the user, merge the up-to-date version of the content item transparently to the user into the UI unit being displayed, to replace the initially displayed version.

2. The apparatus according to claim 1, wherein the one or more processors are configured to merge the up-to-date version of the content item into the UI unit by replacing only visible pixels belonging to the content item, while retaining initially-displayed pixels that do not belong to the content item.

3. The apparatus according to claim 1, wherein only a partial range of the UI unit is visible to the user at a given time, and wherein the one or more processors are configured to merge the up-to-date version of the content item into the UI unit without making a different partial range visible to the user.

4. The apparatus according to claim 1, wherein the one or more processors are configured to replace the initially displayed version of the content item with the up-to-date version, without generating to the user any indication that the initially displayed version has been replaced.

5. The apparatus according to claim 1, wherein the one or more processors are configured to merge the up-to-date version of the content item into the UI unit only if the content item is not visible to the user without scrolling.

6. The apparatus according to claim 1, wherein the one or more processors are configured to initially display a version of the content item that has been prefetched to the user device, and to fetch the up-to-date version over the communication network in response to the request.

7. The apparatus according to claim 1, wherein the one or more processors are configured to initially display a version of the content item that is cached in a cache memory of the user device, and to fetch the up-to-date version over the communication network.

8. The apparatus according to claim 1, wherein the one or more processors are configured to initially display a version of the content item that is preloaded or pre-rendered in the user device, and to subsequently perform one or more of loading and rendering the up-to-date version.

9. The apparatus according to claim 1, wherein the processors are configured to decide whether or not to obtain and merge an up-to-date version of a given content item, depending on a visibility metric that is indicative of one or more of (i) a time duration and (ii) an amount of user actions, needed to make the given content item visible to the user.

10. The apparatus according to claim 9, wherein the processors are configured to assess the visibility metric relative to one or more of (i) an absolute location of the given content item in the UI unit, (ii) a position of the given content item relative to a portion of the UI unit that is currently displayed on a screen of the user device, (iii) a position of the given content item relative to a launcher of an app, (iv) a position of the given content item relative to a Home screen of a launcher of the user device and (v) a position of the given content item relative to a landing page of an app.

11. The apparatus according to claim 1, wherein the processors are configured to prefetch the up-to-date version before the user requests to access the UI unit, in response to assessing that the up-to-date version can be prefetched using less than a predefined amount of a given resource.

12. The apparatus according to claim 1, wherein the processors are configured to prefetch the up-to-date version before the user requests to access the UI unit, in response to assessing that a likelihood of the user requesting to access the UI unit is higher than a predefined threshold.

13. The apparatus according to claim 1, wherein, when the content item is unavailable for immediate display, the one or more processors are configured to initially display a placeholder content item in place of the content item, and to replace the placeholder content item with the up-to-date version.

14. The apparatus according to claim 1, wherein the initially displayed version of the content item is not up-to-date because the content item has not been defined as subject to prefetching.

15. The apparatus according to claim 1, wherein the initially displayed version of the content item is not up-to-date because the content item has been prefetched using best-effort prefetching and not guaranteed prefetching.

16. The apparatus according to claim 1, wherein the initially displayed version of the content item is not up-to-date because of an error in prefetching the content item.

17. The apparatus according to claim 1, wherein the one or more processors are configured to obtain and merge the up-to-date version for one or more of:
all content items for which the version available for immediate display in the user device is not up-to-date;
at least some of the content items that are not currently visible to the user and for which the version available for immediate display in the user device is not up-to-date; and
one or more content items that are defined as subject for "hit and update."

18. The apparatus according to claim 1, wherein the one or more processors are configured to:
define for the UI unit a visible part and a non-visible part, in accordance with a predefined metric;
prefetch at least some of the visible part;
not prefetch at least some of the non-visible part; and
compensate for up-to-date versions of content not being available at the user device by obtaining and merging the up-to-date versions transparently to the user.

19. A method for content delivery, comprising:
receiving from a user of a user device a request to access a User-Interface (UI) unit that comprises one or more content items;
in response to the request, initially displaying the UI unit to the user with versions of the content items that are available for immediate display in the user device, regardless of whether the initially displayed versions are up-to-date or not, wherein the displayed UI unit has a first range that is visible to the user and a second range that is invisible to the user; and
for at least a content item, which is part of the UI unit and whose initially displayed version is not up-to-date:
obtaining an up-to-date version of the content item;
determining whether the content item is in the second range of the UI unit that is currently invisible to the user; and
only if the content item is part of the UI unit but is in the second range of the UI unit that is currently invisible to the user, merging the up-to-date version of the content item transparently to the user into the UI unit being displayed, to replace the initially displayed version.

20. The method according to claim 19, wherein merging the up-to-date version of the content item into the UI unit comprises replacing only visible pixels belonging to the content item, while retaining initially-displayed pixels that do not belong to the content item.

21. The method according to claim 19, wherein only a partial range of the UI unit is visible to the user at a given time, and wherein merging the up-to-date version of the content item into the UI unit is performed without making a different partial range visible to the user.

22. The method according to claim 19, wherein merging the up-to-date version of the content item into the UI unit is performed without generating to the user any indication that the initially displayed version has been replaced.

23. The method according to claim 19, wherein merging the up-to-date version of the content item into the UI unit is performed only if the content item is not visible to the user without scrolling.

24. The method according to claim 19, wherein initially displaying the versions available in the user device comprises initially displaying a version of the content item that has been prefetched to the user device, and wherein obtaining the up-to-date version comprises fetching the up-to-date version over the communication network in response to the request.

25. The method according to claim 19, wherein initially displaying the versions available in the user device comprises initially displaying a version of the content item that is cached in a cache memory of the user device, and wherein obtaining the up-to-date version comprises fetching the up-to-date version over the communication network.

26. The method according to claim 19, wherein initially displaying the versions available in the user device comprises initially displaying a version of the content item that is preloaded or pre-rendered in the user device, and wherein obtaining and merging the up-to-date version comprises subsequently performing one or more of loading and rendering the up-to-date version.

27. The method according to claim 19, wherein obtaining and merging an up-to-date version comprises deciding whether or not to obtain and merge an up-to-date version of a given content item, depending on a visibility metric that is indicative of one or more of (i) a time duration and (ii) an amount of user actions, needed to make the given content item visible to the user.

28. The method according to claim 27, and comprising assessing the visibility metric relative to one or more of (i) an absolute location of the given content item in the UI unit, (ii) a position of the given content item relative to a portion of the UI unit that is currently displayed on a screen of the user device, (iii) a position of the given content item relative to a launcher of an app, (iv) a position of the given content item relative to a Home screen of a launcher of the user device and (v) a position of the given content item relative to a landing page of an app.

29. The method according to claim 19, wherein obtaining the up-to-date version comprises prefetching the up-to-date version before the user requests to access the UI unit, in response to assessing that the up-to-date version can be prefetched using less than a predefined amount of a given resource.

30. The method according to claim 19, wherein obtaining the up-to-date version comprises prefetching the up-to-date version before the user requests to access the UI unit, in response to assessing that a likelihood of the user requesting to access the UI unit is higher than a predefined threshold.

31. The method according to claim 19, and comprising, when the content item is unavailable for immediate display, initially displaying a placeholder content item in place of the content item, and to replace the placeholder content item with the up-to-date version.

32. The method according to claim 19, wherein the initially displayed version of the content item in not up-to-date because the content item has not been defined as subject to prefetching.

33. The method according to claim 19, wherein the initially displayed version of the content item in not up-to-date because the content item has been prefetched using best-effort prefetching and not guaranteed prefetching.

34. The method according to claim 19, wherein the initially displayed version of the content item in not up-to-date because of an error in prefetching the content item.

35. The method according to claim 19, wherein obtaining and merging the up-to-date version is performed for one or more of:
  all content items for which the version available for immediate display in the user device is not up-to-date;
  at least some of the content items that are not currently visible to the user and for which the version available for immediate display in the user device is not up-to-date; and
  one or more content items that are defined as subject for "hit and update."

36. The method according to claim 19, wherein initially displaying the UI unit, and obtaining and merging the up-to-date version, comprise:
  defining for the UI unit a visible part and a non-visible part, in accordance with a predefined metric;
  prefetching at least some of the visible part;
  not prefetching at least some of the non-visible part; and
  compensating for up-to-date versions of content not being available at the user device by obtaining and merging the up-to-date versions transparently to the user.

* * * * *